L. J. PIANAROSA.
RESILIENT TOOL REST.
APPLICATION FILED FEB. 24, 1917.
1,245,020.
Patented Oct. 30, 1917.
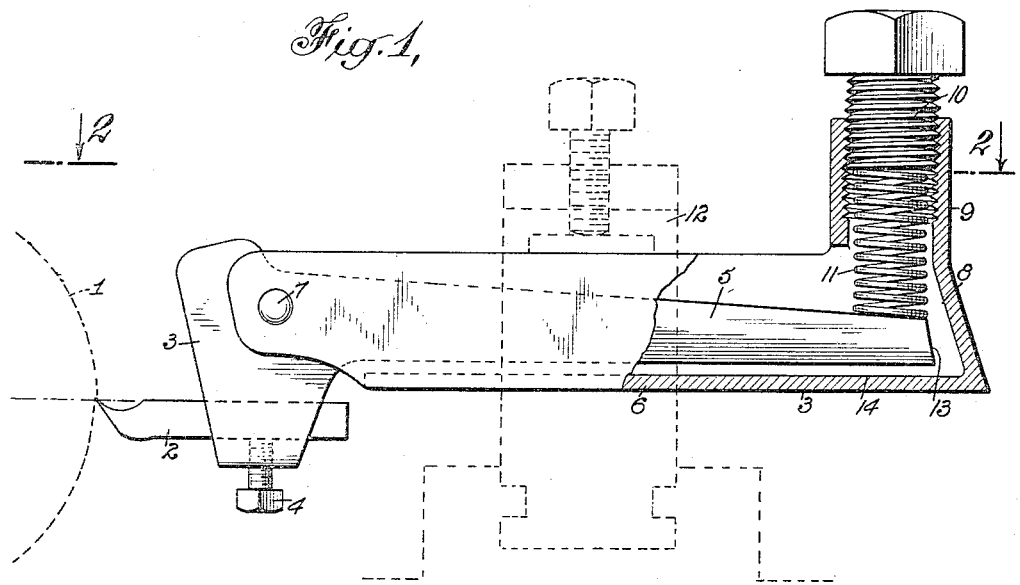
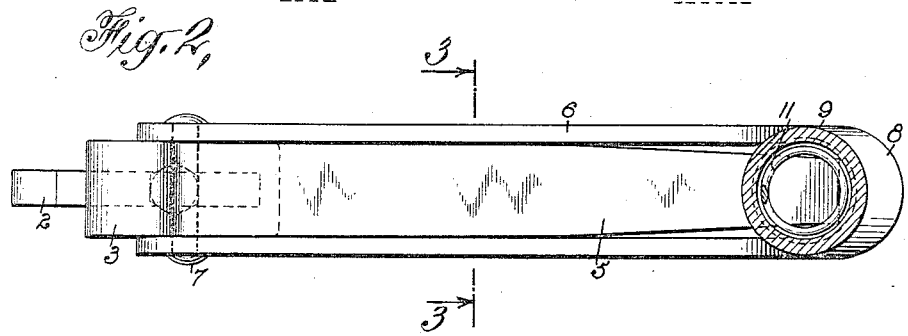
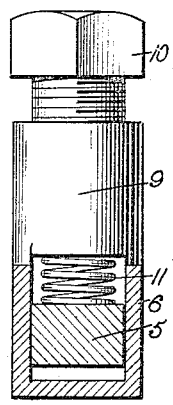
WITNESSES
L. Hauerstein
A. L. Kitchin.
INVENTOR
Louis J. Pianarosa
BY Mumu & Co.
ATTORNEYS

UNITED STATES PATENT OFFICE.

LOUIS J. PIANAROSA, OF TRENTON, NEW JERSEY.

RESILIENT TOOL-REST.

1,245,020.  Specification of Letters Patent.  Patented Oct. 30, 1917.

Application filed February 24, 1917. Serial No. 150,724.

*To all whom it may concern:*

Be it known that I, LOUIS J. PIANAROSA, a citizen of the United States, and a resident of Trenton, in the county of Mercer and State of New Jersey, have invented a new and Improved Resilient Tool-Rest, of which the following is a full, clear, and exact description.

This invention relates to tool rests and has for an object the provision of an improved construction formed so as to cause a cutting tool to properly operate while preventing a breaking thereof when an extra strain is brought to bear thereon.

Another object in view is to provide a rest or holder for a tool which will allow the tool to move when an extra strain is brought to bear thereon and thereby prevent the tool from gouging or digging into the work.

A still further object in view is to provide a holding device or rest which may be used for lathes, planing machines or other machines, for holding a tool in proper position for cutting while allowing the tool to move aside when an undesirable pressure has been brought to bear thereon.

In the accompanying drawing:

Figure 1 is a side view of a device embodying the invention certain parts being broken away, the device being shown in position ready for use.

Fig. 2 is a top plan view of the holding device or rest shown in Fig. 1.

Fig. 3 is a section through Fig. 2 on line 3—3.

Referring to the accompanying drawing by numerals, 1 indicates a piece of work against which the tool 2 rests and which is intended to be operated on by the tool. The holder 3 properly supports the tool 2 at any desired point in relation to the work 1, namely, above, on or below a central line, preferably either on or below, so that the tool may move to one side, as hereinafter fully described, when too much material has been taken off or when an extra hard spot has been engaged. The tool 2 is fitted into the head 3 and clamped therein by any suitable means, as for instance, a clamping screw 4, so that the tool will move with the head 3, which head is provided with an arm 5 extending rearwardly to near the end of the casing 6. A pivotal pin 7 connects head 3 with the sides of the casing 6 so that the head, together with arm 5, is pivotally mounted. Preferably the casing 6 is made U-shaped in cross section, as shown in Fig. 3, though this is not absolutely necessary provided ample space is allowed for the movement of arm 5.

It will be observed that the end of the casing 6 is inclined or beveled at 8 and then merges into a tubular interiorly threaded extension 9 for receiving the adjusting screw 10. A spring 11 is arranged in the tubular extension 9 and rests on the end of arm 5, said spring normally preventing movement of tool 2 while allowing a movement of said tool when an extra hard substance has been engaged. The tension of spring 11 may be varied by a proper adjustment of screw 10 so that a greater or less resistance is provided with the tool 2. By providing means for allowing the tool 2 to move to one side will prevent said tool from gouging the work 1 whether the same is in a lathe or planing machine. The casing 6 is held in position by a tool post 12 which may be of any desired construction, the same forming no part of the present invention.

In case the pivotal movement of the arm 5 reaches its limit the inclined or beveled end 13 of arm 5 strikes the beveled part 8 of casing 6. If desired, the screw 10 could be adjusted so that the free end of arm 5 will normally rest on the bottom 14 but will be held against bottom 14 by spring 11 until it is necessary for the tool 2 to move to one side. By this construction and arrangement of means for holding the tool in place during the normal operation and allowing the same to move aside under extraordinary circumstances, the tool is preserved and prevented from becoming broken, while at the same time the work is not injured by gouges commonly experienced in turning or shaping pieces of work.

What I claim is:

1. A tool holder of the character described, comprising a casing designed to be clamped rigidly in position, said casing being hollow and having a hollow projection extending at right angles to the main part of the casing, said projection being arranged adjacent one end, an arm pivotally mounted in said casing at the end opposite said projection, said arm at the pivotal end carrying a receiving head, a spring arranged in said extension and engaging said arm, and an adjustable member engaging said extension and acting on said spring for varying the tension thereof.

2. A tool holder of the character described, comprising a casing, an arm pivotally mounted at one end arranged in said casing, said arm having a tool receiving head, and a spring acting on the free end of said arm for normally preventing movement of said arm under ordinary strain while allowing a movement under extraordinary strain.

3. A tool holder of the character described, comprising a casing designed to be clamped in position, a pivotally mounted member arranged in said casing having a head and an arm, means for clamping a tool in said head, and a spring acting against the free end of said arm for normally preventing movement of the arm while allowing a movement of the arm under extraordinary pressure.

LOUIS J. PIANAROSA.

Copies of this patent may be obtained for five cents each, by addressing the "Commissioner of Patents, Washington, D. C."